(12) United States Patent
Taber

(10) Patent No.: US 11,225,941 B2
(45) Date of Patent: Jan. 18, 2022

(54) SYSTEMS AND METHODS FOR CAPTURING RENEWABLE ENERGY

(71) Applicant: Flöt Co., Fayetteville, NC (US)

(72) Inventor: Sarah Taber, Fayetteville, NC (US)

(73) Assignee: Flöt Co., Fayetteville, NC (US)

( * ) Notice: Subject to any disclaimer, the term of this patent is extended or adjusted under 35 U.S.C. 154(b) by 0 days.

(21) Appl. No.: 17/103,808

(22) Filed: Nov. 24, 2020

(65) Prior Publication Data
US 2021/0156353 A1 May 27, 2021

Related U.S. Application Data

(60) Provisional application No. 62/940,153, filed on Nov. 25, 2019.

(51) Int. Cl.
*F03B 13/10* (2006.01)
*H02J 3/38* (2006.01)
*H02K 7/18* (2006.01)

(52) U.S. Cl.
CPC ............. *F03B 13/10* (2013.01); *H02J 3/381* (2013.01); *H02K 7/1823* (2013.01); *H02J 2300/24* (2020.01); *H02J 2300/28* (2020.01)

(58) Field of Classification Search
CPC ....... F03B 13/10; H02J 3/381; H02J 2300/28; H02J 2300/24; H02K 7/1823
See application file for complete search history.

(56) References Cited

U.S. PATENT DOCUMENTS

2020/0056578 A1* 2/2020 Sheldon-Coulson ........................ F03B 13/142

OTHER PUBLICATIONS

"Wave Dragon: An Ocean of Opportunities;" first accessed Aug. 2019, 2 pages.

* cited by examiner

*Primary Examiner* — Tulsidas C Patel
*Assistant Examiner* — Joseph Ortega
(74) *Attorney, Agent, or Firm* — Carr & Ferrell LLP

(57) ABSTRACT

Systems and methods for capturing renewable energy are disclosed herein. An example system can include a concave receptacle configured to float on top of water, a turbine positioned centrally with the concave receptacle, a buoyancy control system having a pump and one or more vessels, a controller having a processor and memory for storing instructions, the processor executing the instructions to cause the buoyancy control system to submerge the concave receptacle under the water by filling the one or more vessels with a fluid using the pump and cause the buoyancy control system to release the fluid from the one or more vessels and allow the concave receptacle to travel upwardly so that water is directed into the turbine to produce electricity.

14 Claims, 4 Drawing Sheets

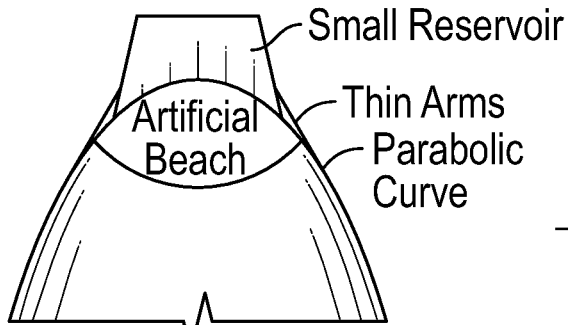
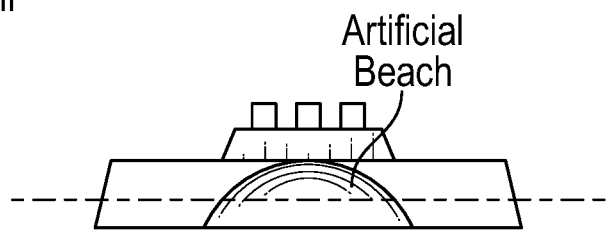
Bird's-Eye View
**FIG. 1A
(Prior Art)**
Wave's-Eye View
**FIG. 1B
(Prior Art)**
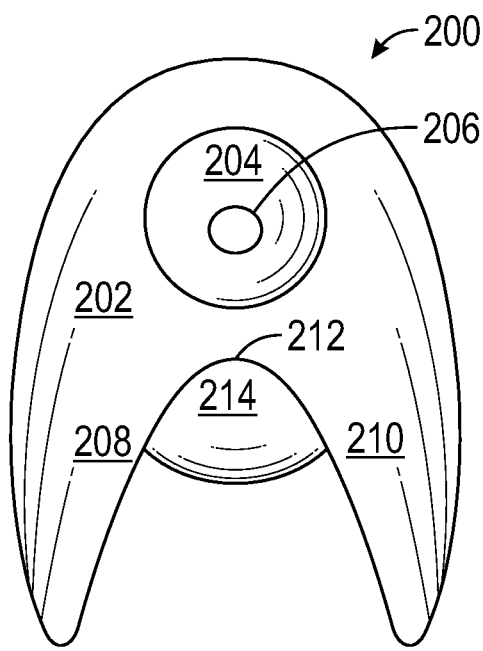
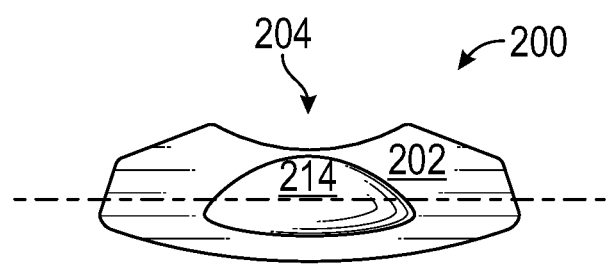
FIG. 2
FIG. 3

Plain Island

Closed Atoll

SYSTEMS AND METHODS FOR CAPTURING RENEWABLE ENERGY

CROSS REFERENCE(S) TO RELATED APPLICATION(S)

This application claims the benefit and priority of U.S. Provisional Application Ser. No. 62/940,153, filed on Nov. 25, 2019, which is hereby incorporated by reference in its entirety, including all references and appendices cited therein, for all purposes, as if fully set forth herein.

FIELD OF INVENTION

Embodiments of the present disclosure relate to systems and methods for capturing renewable energy by way of overtopping wave and/or tidal devices. Further embodiments of the present disclosure provides for systems and methods for building floating land masses for the ocean to provide natural habitats.

SUMMARY

According to some embodiments, the present disclosure may be directed to a system for capturing energy, the system comprising: a concave receptacle configured to float on top of water; a turbine positioned centrally with the concave receptacle; a buoyancy control system; and a controller having a processor and memory for storing instructions, the processor executing the instructions to: cause the buoyancy control system to submerge the concave receptacle under the water; and cause the buoyancy control system to release the concave receptacle and allow the concave receptacle to travel upwardly so that water is directed into the turbine to produce electricity.

According to some embodiments, the present disclosure may be directed to a system for capturing energy, the system comprising a concave receptacle configured to float on top of water; a turbine positioned centrally with the concave receptacle; a buoyancy control system having a pump and one or more vessels; and a controller having a processor and memory for storing instructions, the processor executing the instructions to: cause the buoyancy control system to submerge the concave receptacle under the water by filling the one or more vessels with a fluid; and cause the buoyancy control system to replace the fluid from the one or more vessels with air and allow the concave receptacle to travel upwardly so that water is directed into the turbine to produce electricity.

According to some embodiments, the present disclosure may be directed to a system for capturing energy, the system comprising: a concave receptacle; two arcuate armatures that extend from the concave receptacle, the two arcuate armatures directing water towards the concave receptacle; an artificial beach located at a confluence point of the two arcuate armatures, wherein water overtops the artificial beach to enter the concave receptacle; and a turbine positioned centrally with the concave receptacle to generate energy from the water entering the concave receptacle.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

FIGS. 1A and 1B illustrate a top bottom view and a cross sectional view, respectively, of a prior art system.

FIG. 2 illustrates a top view of an exemplary system in accordance with the present disclosure.

FIG. 3 illustrates a cross sectional view of the exemplary system of FIG. 2, in accordance with the present disclosure.

DETAILED DESCRIPTION

Overview

Figure 4:
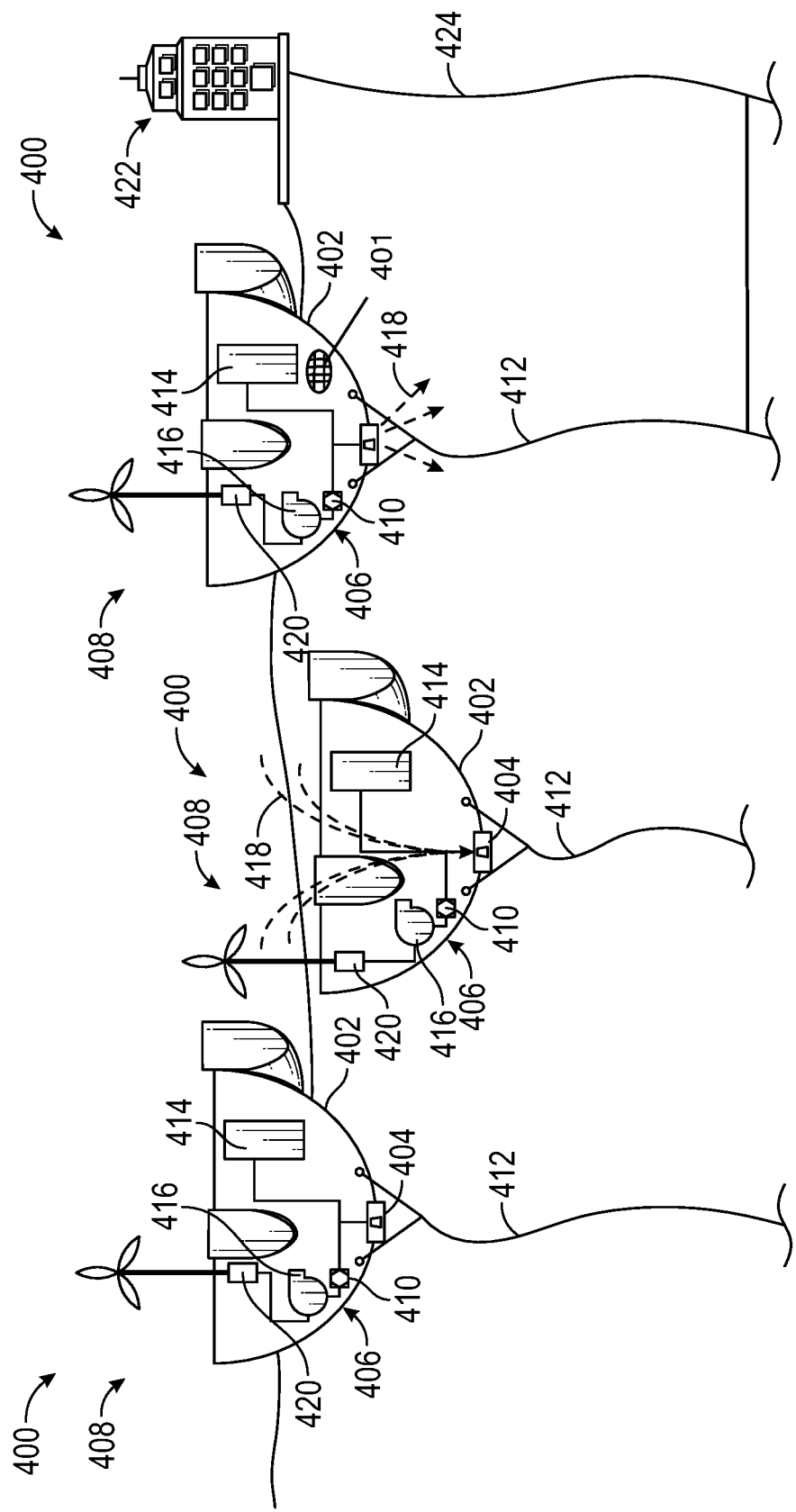
FIG. 4 is a schematic view of another example system in operation.

The present disclosure provides for systems and methods of building energy devices by way of innovative overtopping devices that capture renewable wave and/or tidal energy. Furthermore, the present disclosure provides for systems and methods to build land masses that can float in bodies of water, thereby providing natural habitats that do not disrupt oceanic wildlife. The various embodiments of the present disclosure allow for multiple innovative technological advances and advantageous uses which will be discussed at greater length later herein.

EXAMPLE EMBODIMENTS

In the prior art, as shown in FIGS. 1A and 1B, conventional overtopping wave/tidal devices are made of steel reef, enforced steel, concrete materials and the like. As can be expected, by utilizing these types of materials, the costs of producing such conventional devices are relatively high. Typically, a conventional overtopping device is constructed and molded on land, and then shipped in one piece out to sea. In FIG. 1A, a top view (that is, from a bird's eye view) of a prior art device as it is floating in water is illustrated. In FIG. 1B, a cross-sectional view (or a wave's eye view) of the prior art device is depicted.

As shown in FIGS. 1A and 1B, the front face of the prior art device can be a curved ramp. The prior art device is provided in a particular shape as shown in FIGS. 1A and 1B, such that the device focuses the waves to climb higher and effectively climb the curved ramp. Waves can overtop the ramp and fall into a reservoir, over a floating hydro-electric dam or turbine outlets, in order to capture the wave energy. In other words, power production occurs as the water that is stored in the reservoir, having a higher potential energy than that of the surrounding water, is drained back to the ocean through a set of turbine generators, driving the turbines, and allowing for the capture of renewable wave energy.

Also, as shown in FIG. 1A, reflector arms can be included in the conventional overtopping wave devices to gather waves and to push the waves up the curved ramp. As shown in both FIGS. 1A and 1B, an artificial beach can also be built so that waves can crash up and forward, thereby driving water into a reservoir.

These devices can also be used to make tidal energy. Mooring and/or flotation can be made in such a way that high tides fill the reservoir with water. As tide recedes the water then exits the reservoir, driving the turbines.

Flotation and mooring may also be used to raise and lower the level of these devices at will, gathering water into the reservoir when energy demands are low. When energy demands are higher, flotation can raise the level of the device, driving water to exit the reservoir and drive the turbines. As the device becomes lighter due to reduced reservoir level, the device continues to rise and drive more water through the turbines.

These overtopping devices can either be left to run and simply generate electricity whenever wave and/or tidal resources are available. However, they can also be used as a dispatchable complement to non-dispatchable energy resources like wind and solar. This can be used to cover gaps in solar/wind energy availability, and/or take advantage of periods of high electricity prices.

Now turning to FIGS. 2 and 3, embodiments of the systems and devices of the present disclosure are depicted. Specifically, in contrast with conventional prior art devices, the present disclosure provides for a system (overtopping device 200) that is more robust in shape than conventional prior art devices with several innovative features. This is mainly to account for differences in material composition & compression/shear strength properties than prior art. FIG. 2 provides a top view and FIG. 3 provides a cross sectional view of the overtopping device, in accordance with embodiments of the present disclosure. As shown in FIGS. 2 and 3, the overtopping device 200 may include more material than that of conventional prior art devices, but because of the materials that are used, it is relatively easier and less costly to build.

In various embodiments of the present disclosure, the overtopping devices and systems of the present disclosure can be constructed using rebar or metal materials for the skeleton of the device. The overtopping device may also include a skin 202 made of mesh or mesh-like materials sculpted into the desired shape. Also, accompanying flotation devices, internal air tanks, spar buoys, mooring systems, and the like (illustrated in the example of FIG. 4) can be utilized with the exemplary systems and devices to help provide flotation, buoyancy, and anchoring.

Still referring to FIG. 3, the skin 202 of the overtopping device can include a metal skeleton that is advantageous because one can apply a weak electric charge to the skeleton. When properly charged, metal surfaces in the ocean typically begin to accrete calcium carbonate minerals such as (but not limited to) aragonite, brucite, calcite, and limestone. This mineral accretion fills in the gaps in the metal mesh and between the mesh and skeleton members, building a solid rock-like surface. This can be compared to a 3-D printing process using minerals naturally present in the ocean. The resulting material matrix is comparable to steel-reinforced concrete, although its material properties (such as compressive and shear strength) are different.

Structures built by this method are quickly colonized by reef-building organisms such as corals, bivalves, crustose algae, and sponges, as well as fish and invertebrate wildlife. This electro-mineral accretion technique is already used around the world to rehabilitate coral and bivalve reefs and dramatically increases their survival in spite of environmental stresses like nutrient pollution, acidity, and heat-induced bleaching. In this way, these structures do not pose an environmental hazard as many offshore devices can. They can double as habitat, fisheries enhancement, "arks," and nurseries for ecological rehabilitation.

One of the various novel aspects of the overtopping device, as provided in the present disclosure, is that the device is self-healing. Should damage occur due to storms or collisions, and cracks, flaws, or holes form on the device, it is self-healing in that an electric current applied to the device can result in the growth of minerals, coral, shellfish, and the like into the cracks of the device. In other words, the embodiments of the overtopping devices of the present disclosure reduce the risk of failures occurring to the devices because the devices are self-healing.

Also, because of the self-healing aspect of the device, embodiments of the device according to the present disclosure are relatively inexpensive to repair compared to conventional construction techniques. They can also be repaired in place and continue to generate energy (although potentially at a reduced rate) while under repair, rather than needing to be deactivated and towed back to shore for dry dock repairs. Typically, when faults, cracks and flaws form, conventional devices must be towed from the ocean onto the shore, dry docked, repaired and then towed back into the ocean in order to properly repair the conventional devices. This self-healing nature means that unlike conventional construction where the device has a finite lifetime, those built by electro-mineral accretion are effectively self-healing living reefs with no natural or engineering limit to their lifespan.

Another novel aspect of the overtopping systems and devices, as provided in the present disclosure, is that they are ideal habitats for ocean life. Specifically, they are ideal structures for fish and other oceanic life because they are reef structures. Unlike conventional overtopping devices which are large structures at sea that can be noisy, a collision hazard, or otherwise distracting to ocean wildlife, the structure of the overtopping device as disclosed in the present disclosure is a natural fit for ocean wildlife. This is because the roughness of the minerals, coral and shellfish on the outside of the device structure dampens noise and mimics natural reef structures than ocean wildlife is already adept at navigating. Also, the device itself looks and behaves like a natural reef belonging in the natural oceanic environment because it effectively is a natural reef—just grown in a specified shape (see FIGS. 2 and 3). Furthermore, if a catastrophic failure occurs to the device, the device can be sunk and then it becomes a reef on the bottom of the ocean because of its calcium carbonate structure.

The overtopping device 200 can comprise a reservoir 204 having a concave cross section (see FIG. 3). The reservoir 204 receives overtopped water as noted above and funnels the water through a turbine 206 to generate power. The overtopping device 200 can comprise armatures 208 and 210 that funnel or otherwise direct water into a confluence point 212. Water pushed towards the confluence point 212 encounters an artificial beach 214. The water can be pushed over the artificial beach 214 into the reservoir 204.

Referring now to FIG. 4, which illustrates another example renewable energy system 400 of the present disclosure. FIG. 4 also schematically illustrates operations of the system 400 that are performed during a power generation cycle. The system 400 can generally comprise a receptacle 402, a turbine 404, a buoyancy system 406, a power harvesting system 408, a controller 410, and a tether 412. The receptacle 402 can be configured as a bowl, which funnels water into a bottom of the receptacle where the turbine 404 is positioned. A skin or coating of the receptacle of the system 400 can include a metal skeleton 401 that is advantageous because one can apply a weak electric charge to the skeleton. When properly charged, metal surfaces in the ocean typically begin to accrete calcium carbonate minerals such as (but not limited to) aragonite, brucite, calcite, and limestone. This mineral accretion fills in the gaps in the metal mesh and between the mesh and skeleton members, building a solid rock-like surface. In some embodiments, the turbine 404 can be located centrally in the receptacle 402. The exact dimensions and shape of the receptacle 402 can be configured according to performance and/or design requirements. The buoyancy system 406 can include one or more vessels 414 that can be sealed and filled with a fluid, such as water or air. The receptacle 402 can be submerged by filling the one or more vessels 414 with water by opening a valve on the one or more vessels 414. As the receptacle 402 submerges, water 418 fills the receptacle 402. In some embodiments, the one or more vessels 414 can be integrated into the structure of the receptacle itself, or can be added on or attached to the outer surface of the receptacle 402.

Once submerged and filled (partially or completely) with the water 418, pump 416 can be triggered to purge the water from one or more vessels 414 by filling them with air, which causes the receptacle 402 to travel upwardly in the water column. The water 418 in the receptacle 402 is channeled through the turbine 404 to generate energy.

In some embodiments, the system 400 utilizes the power harvesting system 408 to generate energy from, for example, wind or solar, to power the operations of the controller 410 and the buoyancy system 406. In some instances, some power generated using the turbine 404 can be directed to a load 422 or power storage apparatus, such as a battery 420 through a submerged powerline 424.

As noted above, the system 400 includes a tether 412. The tether 412 can embed a sealed conductor such as copper that can be used to transfer power generated by the turbine 404 to a load or storage location (not shown). The receptacle 402 returns to a floating configuration after power generation. The tether 412 can be used to couple the system 400 to a structure or floor, such as the floor of an ocean, sea, or lake—just to name a few.

The controller 410 can be configured to cause the system 400 to generate power according to a predetermined operating cycle. For example, the controller 410 can be configured to cause the system 400 to perform a power generation cycle (such as submerge, release, water funneling through turbine) each time the power harvesting system 408 has harvested enough energy to trigger operation (e.g., a threshold amount determined according to pump operating parameters) of the buoyancy system 406 (e.g., pump activation to fill vessels). The controller 410 can be configured to cause the cause the buoyancy control system to submerge the concave receptacle under the water. The controller 410 can also cause the buoyancy control system to release the concave receptacle and allow the concave receptacle to travel upwardly so that water is directed into the turbine to produce electricity.

FIGS. 5A, 5B, 6A, and 6B each encompass different configurations of overtopping devices and systems that can be adapted for use in accordance with the present disclosure. These shapes can be used in place of the receptacle 402 of FIG. 4. Thus, each of these embodiments can include any of the components described above with respect to FIG. 4. Moreover, the embodiments of FIGS. 2 and 3 can also each include various components of the embodiment of FIG. 4.

Figure 6A:
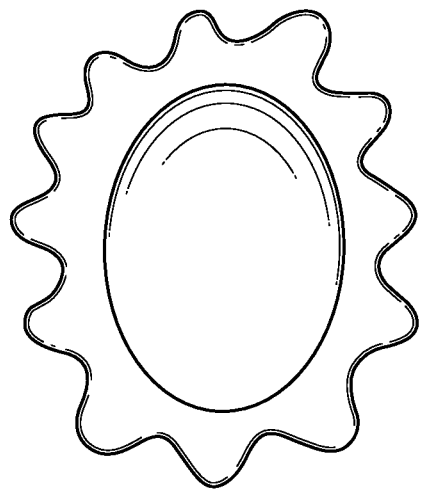
FIG. 6A illustrates a top view of an exemplary system in accordance with the present disclosure.
Figure 6B:
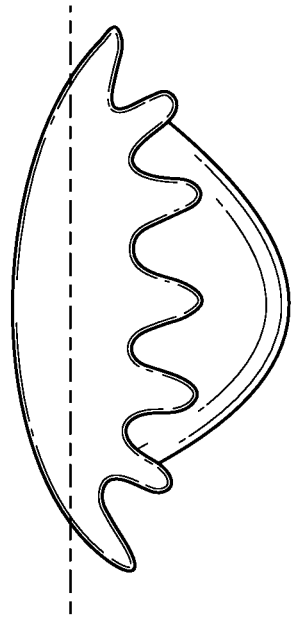
FIG. 6B illustrates a cross sectional view of the exemplary system of FIG. 5A in accordance with the present disclosure.
Figure 5A:
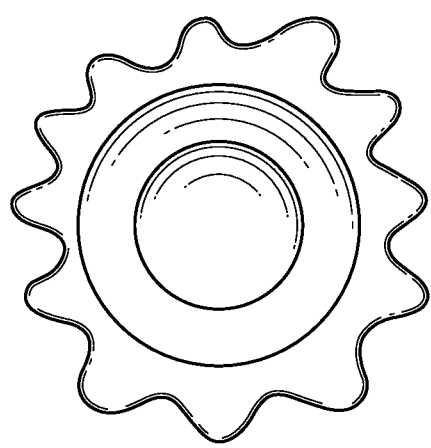
FIG. 5A illustrates a top view of an exemplary system in accordance with the present disclosure.
Figure 5B:
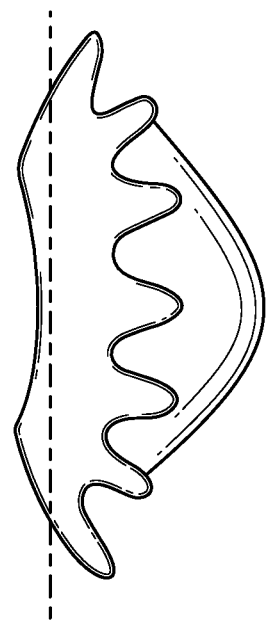
FIG. 5B illustrates a cross sectional view of the exemplary system of FIG. 4A, in accordance with the present disclosure.

A further novel aspect of the type of construction used to make these overtopping devices and systems as provided in the present disclosure is that they can be made or combined into floating land masses. In the future, it may be that such land masses may be used inhabited by people. For instance, in FIGS. 5A and 5B, top and cross sectional views, respectively, of an exemplary closed atoll are provided. The land mass can be in a donut ring shape. Alternatively, the systems and devices can be used to create a simple island without a central atoll. FIGS. 6A and 6B provide a top view and cross section view, respectively, of an exemplary plain island utilizing the devices and systems described herein. The larger mass of the plain island can be made in the shape of a bun or pancake without a central atoll or depression.

Figure 7:
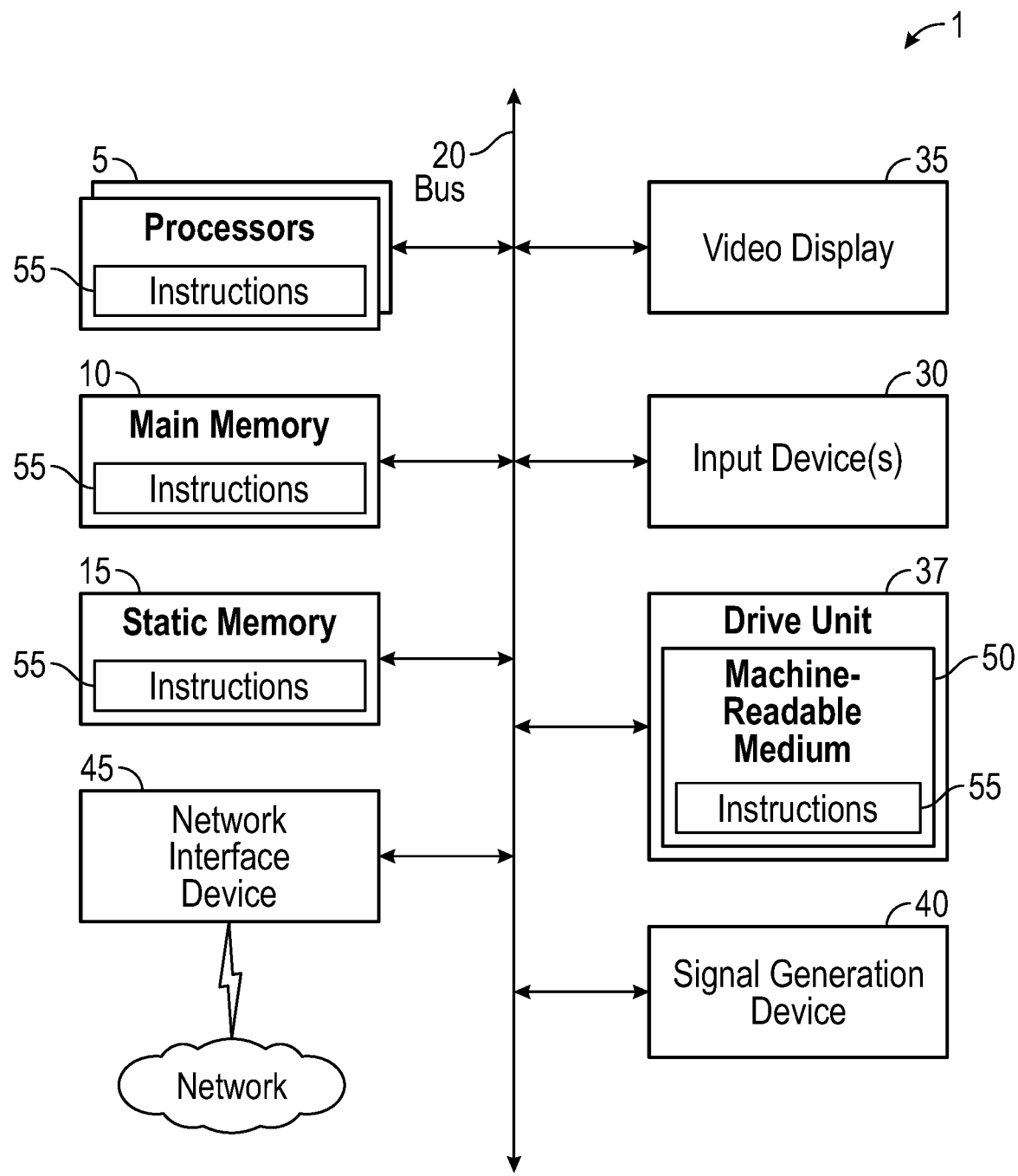
FIG. 7 illustrates an exemplary computer system that may be used to implement some or all embodiments of the system.

FIG. 7 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as a Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alphanumeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

The components provided in the computer system 1 of FIG. 10 are those typically found in computer systems that may be suitable for use with embodiments of the present disclosure and are intended to represent a broad category of such computer components that are well known in the art. Thus, the computer system 1 of FIG. 10 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, TIZEN, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

In some embodiments, the computer system 1 may be implemented as a cloud-based computing environment, such as a virtual machine operating within a computing cloud. In other embodiments, the computer system 1 may itself include a cloud-based computing environment, where the functionalities of the computer system 1 are executed in a distributed fashion. Thus, the computer system 1, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the computer system 1, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The foregoing detailed description includes references to the accompanying drawings, which form a part of the detailed description. The drawings show illustrations in accordance with exemplary embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents. In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls. The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

The foregoing detailed description includes references to the accompanying drawings, which form a part of the detailed description. The drawings show illustrations in accordance with exemplary embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A system for capturing energy, the system comprising:
    a concave receptacle configured to float on top of water, the concave receptacle comprises a metal skeleton that has been charged to encourage accretion of calcium carbonate minerals;
    a turbine positioned centrally with the concave receptacle;
    a buoyancy control system; and
    a controller having a processor and memory for storing instructions, the processor executing the instructions to:
        cause the buoyancy control system to submerge the concave receptacle under the water; and
        cause the buoyancy control system to release the concave receptacle and allow the concave receptacle to travel upwardly so that water is directed into the turbine to produce electricity.

2. The system for capturing energy according to claim 1, further comprising a power harvesting system that captures at least one of solar power and/or wind power to provide energy to the buoyancy control system and the controller.

3. The system for capturing energy according to claim 1, wherein the buoyancy control system comprises a pump and one or more vessels, the pump filling the one or more vessels with air which causes the concave receptacle to travel upwardly.

4. The system for capturing energy according to claim 3, wherein the buoyancy control system is configured to fill the one or more vessels with a fluid to submerge the concave receptacle.

5. The system for capturing energy according to claim 1, wherein the concave receptacle comprises a closed atoll.

6. A system for capturing energy, the system comprising:
- a concave receptacle configured to float on top of water, the concave receptacle comprises a metal skeleton that has been charged to encourage accretion of calcium carbonate minerals;
- a turbine positioned centrally with the concave receptacle;
- a buoyancy control system having a pump and one or more vessels; and
- a controller having a processor and memory for storing instructions, the processor executing the instructions to:
  - cause the buoyancy control system to submerge the concave receptacle under the water by filling the one or more vessels with water; and
  - cause the pump to purge the water from the one or more vessels using air to fill the one or more vessels and allow the concave receptacle to travel upwardly so that water is directed into the turbine to produce electricity.

7. The system for capturing energy according to claim 6, further comprising a power harvesting system that captures at least one of solar power and/or wind power to provide energy to the buoyancy control system and the controller.

8. The system for capturing energy according to claim 6, wherein the pump fills the one or more vessels with compressed air.

9. The system for capturing energy according to claim 8, wherein the buoyancy control system is configured to open a valve of the one or more vessels to allow the one or more vessels to fill with water.

10. The system for capturing energy according to claim 6, further comprising a tether for coupling the system to a structure or floor.

11. The system for capturing energy according to claim 10, wherein the tether embeds a conductor for transferring power generated by the system to a submerged powerline.

12. The system for capturing energy according to claim 6, wherein the controller is configured to cause the system to perform a predetermined operating cycle that includes activating the buoyancy control system to submerge the concave receptacle when a power harvesting system has harvested a threshold amount of energy to trigger operation of the buoyancy control system.

13. A system for capturing energy, the system comprising:
- a concave receptacle comprising a metal skeleton that has been charged to encourage accretion of calcium carbonate minerals;
- two arcuate armatures that extend from the concave receptacle, the two arcuate armatures directing water towards the concave receptacle;
- an artificial beach located at a confluence point of the two arcuate armatures, wherein water overtops the artificial beach to enter the concave receptacle; and
- a turbine positioned centrally with the concave receptacle to generate energy from the water entering the concave receptacle.

14. The system for capturing energy according to claim 13, wherein the concave receptacle comprises a closed atoll.

* * * * *